United States Patent [19]

Satake et al.

[11] Patent Number: 4,962,143
[45] Date of Patent: Oct. 9, 1990

[54] POLY(ARYLENE THIOETHER) BLOCK COPOLYMER FIBERS AND PRODUCTION PROCESS THEREOF

[75] Inventors: Yoshikatsu Satake, Iwaki; Shinji Yamamoto, Urawa; Takashi Kaneko, Tokyo; Masahito Tada, Matsudo; Ken Kashiwadate, Iwaki; Toshiya Mizuno, Tsuchiura; Hiroyuki Endo, Ibaraki; Takayuki Katto, Iwaki; Zenya Shiiki, Narashino, all of Japan

[73] Assignee: Kureha Kagaku Kogyo K.K., Tokyo, Japan

[21] Appl. No.: 424,638

[22] Filed: Oct. 20, 1989

[30] Foreign Application Priority Data

Oct. 25, 1988 [JP] Japan .................. 63-267290
Nov. 15, 1988 [JP] Japan .................. 63-286836
Sep. 26, 1989 [JP] Japan .................. 1-248086

[51] Int. Cl.$^5$ ................. C08K 5/35; C08F 283/00; C08G 14/00
[52] U.S. Cl. ............................... 524/100; 524/103; 524/106; 524/128; 524/323; 524/334; 524/396; 524/405; 524/592; 525/471; 525/537; 264/288.4; 264/290.2
[58] Field of Search .............. 525/471, 537; 524/100, 524/126, 128, 103, 323, 334, 405, 396, 592; 264/288.4, 290.2

[56] References Cited

U.S. PATENT DOCUMENTS

| | | |
|---|---|---|
| 4,590,104 | 5/1986 | Zeiner et al. . |
| 4,690,972 | 9/1987 | Johnson et al. . |
| 4,698,415 | 10/1987 | Sinclair et al. . |
| 4,716,212 | 12/1987 | Gaughan et al. . |
| 4,745,167 | 5/1988 | Iizuka et al. . |
| 4,826,906 | 5/1989 | Satake et al. .......... 524/381 |
| 4,873,283 | 10/1989 | Satake et al. .......... 524/520 |
| 4,886,871 | 12/1989 | Satake et al. .......... 528/226 |
| 4,895,892 | 1/1990 | Satake et al. .......... 524/520 |
| 4,895,893 | 1/1990 | Satake et al. .......... 524/592 |
| 4,895,912 | 1/1990 | Satake et al. .......... 525/471 |
| 4,895,924 | 1/1990 | Satake et al. .......... 528/226 |
| 4,895,925 | 1/1990 | Satake et al. .......... 528/226 |
| 4,897,238 | 1/1990 | Satake et al. .......... 264/288.4 |

FOREIGN PATENT DOCUMENTS

| | | |
|---|---|---|
| 270955 | 6/1988 | European Pat. Off. . |
| 274754 | 7/1988 | European Pat. Off. . |
| 280325 | 8/1988 | European Pat. Off. . |
| 3405523 | 8/1985 | Fed. Rep. of Germany . |
| 47-13347 | 7/1972 | Japan . |
| 60-58435 | 4/1985 | Japan . |
| 60-104126 | 6/1985 | Japan . |
| 61-221229 | 10/1986 | Japan . |

OTHER PUBLICATIONS

*Indian J. Chem.*, vol. 21A, May 1982, pp. 501–502.
*Indian Journal of Pure and Applied Physics,* vol. 22, Apr. 1984, pp. 247–248.
*Mol. Cryst. Liq. Cryst.*, vol. 83, 1982, pp. 229–238.

*Primary Examiner*—Morton Foelak
*Attorney, Agent, or Firm*—Lowe, Price, LeBlanc, Becker & Shur

[57] ABSTRACT

Disclosed herein are poly(arylene thioether) block copolymer fibers formed by melt-spinning a thermoplastic material composed of (A) 100 parts by weight of a particular poly(arylene thioether) block copolymer, (B) up to 50 parts by weight of at least one other thermoplastic resin and (C) up to 10 parts by weight of at least one filler. The poly(arylene thioether) block copolymer alternately comprises at least one poly(arylene thioether-ketone) block having predominant recurring units of the formula

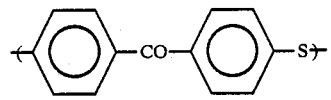

wherein the —CO— and —S— are in the para position to each other and at least one poly(arylene thioether) block having predominant recurring units of the formula

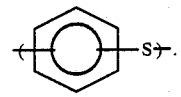

8 Claims, No Drawings

POLY(ARYLENE THIOETHER) BLOCK COPOLYMER FIBERS AND PRODUCTION PROCESS THEREOF

FIELD OF THE INVENTION

This invention relates to fibers using a novel poly(arylene thioether) block copolymer comprising poly(arylene thioether-ketone) blocks and poly(arylene thioether) blocks, and more specifically to fibers which are formed solely from the block copolymer having high melt stability sufficient to permit application of conventional melt processing techniques or a thermoplastic material composed of the block copolymer and at least one other thermoplastic resin and/or at least one filler and have high heat resistance, especially, excellent durability at elevated temperatures, in other words, excellent retention of mechanical strength and the like when held at an elevated temperature for a long period of time; and to a production process thereof.

This invention is also concerned with fibers using a block copolymer containing a specific stabilizer and having still improved melt stability.

BACKGROUND OF THE INVENTION

In the fields of the electronic and electrical industry and the automobile, aircraft and space industries, there is a strong demand in recent years for crystalline thermoplastic resins having high heat resistance of about 300° C. or higher in terms of melting point and moreover easy melt processability.

Recently, poly(arylene thioether-ketones) (hereinafter abbreviated as "PTKs") have drawn attention for their high melting points. Various studies are now under way thereon.

There are some disclosure on PTKs, for example, in Japanese Patent Laid-Open No. 58435/1985, German Offenlegungsschrift No. 34 05 523 A1, Japanese Patent Laid-Open No. 104126/1985, Japanese Patent Laid-Open No. 13347/1972, Indian J. Chem., 21A, 501–502 (May, 1982, Japanese patent Laid-Open No. 221229/1986, U.S. Pat. Nos. 4,716,212, 4,690,972, European Patent Publication No. 0,270,955 A2, European Patent Publication No. 0,274,754 A2, European Patent Publication No. 0,280,325 A2, etc.

Regarding the PTKs described in the above publications, neither molding nor forming has however succeeded to date in accordance with conventional melt processing techniques. Incidentally, the term "conventional melt processing techniques" as used herein means usual melt processing techniques for thermoplastic resins, such as extrusion, injection molding and melt spinning.

The unsuccessful molding or forming of PTKs by conventional melt processing techniques is believed to be attributed to the poor melt stability of the prior art PTKs, which tended to lose their crystallinity or to undergo crosslinking and/or carbonization, resulting in a rapid increase in melt viscosity, upon their melt processing.

The present inventors thus conducted an investigation with a view toward developing a process for economically producing PTKs having melt stability sufficient to permit the application of conventional melt processing techniques. The investigation led to the successful provision of PTKs having significantly improved heat stability upon melting (hereinafter called "melt stability") (Japanese Patent Laid-Open No. 54031/1989).

It has also found that the melt stability of the melt-stable PTKs upon melt processing can be improved further by the addition of a basic compound such as the hydroxide or oxide of a Group IA or Group IIA metal of the periodic table to them (Japanese Patent Application No. 142772/1988).

The melt-stable PTKs obtained as described above have a high melting point, typified by the extremely high melting point of the homopolymer which reaches as high as about 360° C. This is however not all good. Their melt processing temperatures are high accordingly, so that melt processing facilities for high-temperature processing are required. Further, a stringent temperature control is required to perform melt processing without deterioration by heat.

The melt-stable PTKS are generally obtained as fine powders having a particle size of approximately 5–20 μm. This has led to an additional problem upon their production such that they show poor handling properties in their collection step after polymerization, especially in filtration, washing, drying and transportation. Still further problems have also arisen such as poor metering property upon melt processing and occurrence of blocking in hoppers or the like.

OBJECTS AND SUMMARY OF THE INVENTION

An object of this invention is to provide fibers which have high heat resistance, especially, excellent durability at elevated temperatures, in other words, excellent retention of mechanical strength and the like when held at an elevated temperature for a long period of time.

Another object of this invention is to obtain a polymer with improved processability and handling properties while retaining the excellent properties, such as heat resistance and crystallinity, of the aforementioned melt-stable PTKs as much as possible and then to provide fibers having the above-described properties by using the above polymer.

The present inventors then attempted to produce a PTK-PATE block copolymer in which a poly(arylene thioether) (hereinafter abbreviated as "PATE") having recurring units of the formula

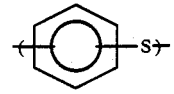

is incorporated as blocks in the chain of a melt-stable PTK. As a result, it has been found that a poly(arylene thioether) block copolymer having excellent processability and high crystallinity can be obtained by using as a prepolymer a PATE, which has a particular average polymerization degree and contains terminal thiolate groups and/or thiol groups as reactive terminal groups, and reacting the PATE prepolymer with a 4,4'-dihalobenzophenone and an alkali metal sulfide under specific conditions in an organic amide solvent.

It has also been found that a block copolymer having excellent properties can be obtained by reacting a PATE prepolymer with a PTK prepolymer under specific conditions.

It has also been uncovered that each of these block copolymers can be obtained as granules having good handling properties from its polymerization systems by a conventional collection method.

It has also been revealed that the block copolymers have high melt stability upon melting and formed or molded products such as fibers can hence be obtained easily by a conventional melt processing technique from the block copolymers alone or a thermoplastic material which is a composition of the block copolymers, at least one other thermoplastic resin and/or at least one filler.

In addition, it has also been found that thermoplastic materials improved still further in melt stability and crystallinity reduction and improved in problems such as sticking of thermal decomposition products to resin residence areas of melt processing equipment can each be obtained by adding a specific basic compound, optionally along with an anti-oxidant, to the above-described thermoplastic material containing the block polymers.

The present invention has been through the completion on the basis of these findings.

In one aspect of this invention, there is thus provided poly(arylene thioether) block copolymer fibers formed by melt-spinning of a thermoplastic material comprising:

(A) 100 parts by weight of a poly(arylene thioether) block copolymer (Component A) alternately comprising (X) at least one poly(arylene thioether-ketone) block having predominant recurring units of the formula

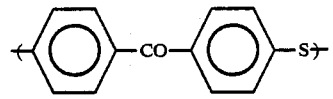

wherein the —CO— and —S— are in the para position to each other and (Y) at least one poly(arylene thioether) block having predominant recurring units of the formula

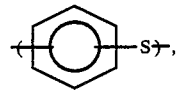

(a) the ratio of the total amount of the poly(arylene thioether) block (Y) to the total amount of the poly(arylene thioether-ketone) block (X) ranging from 0.05 to 5 by weight, (b) the average polymerization degree of the poly(arylene thioether) block (Y) being at least 10, and (c) said block copolymer having a melt viscosity of 50–100,000 poises as measured at 350° C. and a shear rate of 1,200/sec;

(B) optionally, up to 50 parts by weight of at least one other thermoplastic resin (Component B); and (C) optionally, up to 10 parts by weight of at least one filler (Component C).

In a further aspect of this invention, there is also provided a process for the production of poly(arylene thioether) block copolymer fibers from a thermoplastic material composed of:

(A) 100 parts by weight of poly(arylene thioether) block copolymer (Component A) alternately comprising (X) at least one poly(arylene thioether-ketone) block having predominant recurring units of the formula

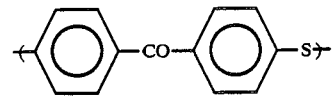

wherein the —CO— and —S— are in the para position to each other and (Y) at least one poly(arylene thioether) block having predominant recurring units of the formula

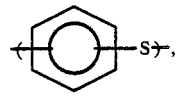

(a) the ratio of the total amount of the poly(arylene thioether) block (Y) to the total amount of the poly(arylene thioether-ketone) block (X) ranging from 0.05 to 5 by weight, (b) the average polymerization degree of the poly(arylene thioether) block (Y) being at least 10, and (c) said block copolymer having a melt viscosity of 50–100,000 poises as measured at 350° C. and a shear rate of 1,200/sec;

(B) optionally, up to 50 parts by weight of at least one other thermoplastic resin (Component B); and (C) optionally, up to 10 parts by weight of at least one filler (Component C), which comprises melt-extruding the thermoplastic material at 300°–400° C. through a spinneret, stretching the resultant filaments at 90°–190° C. and a draw ratio of 1.2–8 times, and then heat-setting the thus-stretched filaments at 100°–340° C. for 0.1–1000 seconds.

In the fibers of the present invention and the production process thereof, the thermoplastic material may further comprises, per 100 parts by weight of the poly(arylene thioether) block copolymer (Component A), 0.1–10 parts by weight of at least one basic compound (Component D) selected from the group consisting of hydroxides, oxides and aromatic carboxylates of group IIA metals of the periodic table other than magnesium, and aromatic carboxylates, carbonates, hydroxides, phosphates, including condensation products, and borates, including condensation products, of group IA metals of the periodic table and 0–10 parts by weight of at least one antioxidant (Component E) selected from the group consisting of hindered phenolic compounds, phosphorus compounds and hindered amine compounds. Use of this thermoplastic material permits the provision of the fibers improved still further in melt stability.

According to this invention, fibers having high heat resistance, especially, excellent durability at elevated temperatures, in other words, excellent retention of mechanical strength and the like when held at an elevated temperature for a long period of time ca easily be obtained by a conventional melt processing technique from a thermoplastic material comprising a high-crystalline poly(arylene thioether) block copolymer, which has high melt stability sufficient to permit application of the conventional melt processing technique and has good processability and handling properties, or if desired, a thermoplastic material which is a composition of the block copolymer, at least one other thermoplastic resin and/or at least one filler.

This invention can also provide, from a thermoplastic material blended with a basic compound or the like, fibers having excellent physical properties while improving problems such as the melt viscosity increase, the crystallinity reduction and the sticking of thermal decomposition products to resin residence areas of melt processing equipment upon conventional melt processing.

The present invention will hereinafter be described in detail.

DETAILED DESCRIPTION OF THE INVENTION

[Component A]

{Poly(Arylene Thioether) Block Copolymers}

[Chemical Structure of Block Copolymers]

The poly(arylene thioether) block copolymer useful in the practice of the present invention is a block copolymer alternately comprising (X) at least one PTK block having predominant recurring units of the formula

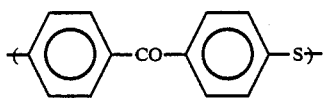

wherein the —CO— and —S— are in the para position to each other and (Y) at least one PATE block having predominant recurring units of the formula

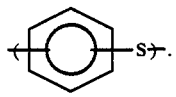

The block copolymer of the present invention can have a desired structure containing both blocks in an alternate order, such as (X)―(Y)—(X)$\overline{]m}$(Y)—(X), m being 0 or an integer of 1 or greater or (X)―(Y)—(X-)―$_n$(Y), n being 0 or an integer of 1 or greater.

It is however required that the weight ratio of the total amount of blocks (Y) to the total amount of blocks (X) be within a range of 0.05–5, preferably 0.1–4, more preferably 0.15–3.

The block (X) serves to impart high degrees of heat resistance and crystallinity to the block copolymer. On the other hand, the block (Y) contributes to the reduction of the processing temperature and the granulation while maintaining the high crystallinity. Therefore, any weight ratios of the total amount of blocks (Y) to the total amount of blocks (X) smaller than 0.05 are too small to achieve any sufficient reduction in processing temperature or the granulation. To the contrary, any ratios greater than 5 lead to a substantial reduction in heat resistance and disturb the balancing between heat resistance and processability. Ratios outside the above range are therefore not preferred.

It is essential for the block (Y) to have an average polymerization degree of at least 10, preferably 20 or higher.

If the average polymerization degree of the block (Y) is smaller than 10, the resulting block copolymer becomes similar to a random copolymer so that physical properties such as crystallinity, heat resistance and melt stability are all reduced substantially. Such small average polymerization degrees are therefore not preferred. In addition, any unduly small average polymerization degree of the block (Y) leads to another problem that a block copolymer of high molecular weight can hardly be obtained.

The block (X) and block (Y) can contain one or more recurring units other than their predominant recurring units of the formulae

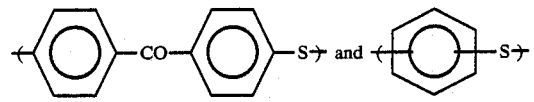

to an extent that the objects of this invention are not impaired.

Exemplary recurring units other than the above recurring units may include:

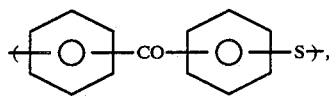

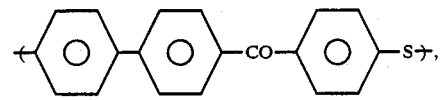

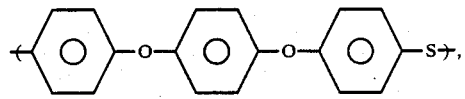

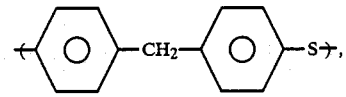

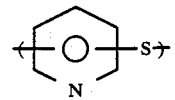

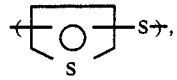

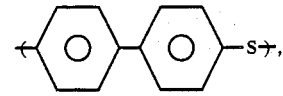

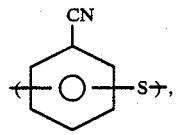

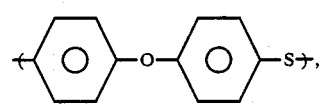

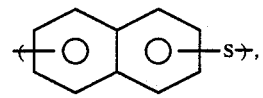

-continued

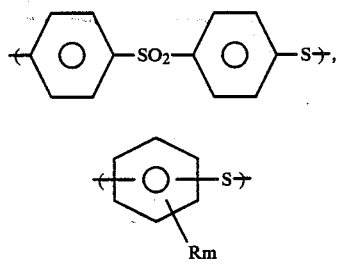

(wherein R means an alkyl group having 5 or less carbon atoms and m stands for an integer of 0–4.).

In general, these other recurring units can be introduced into the block copolymer by using the corresponding various dihalogenated aromatic compounds as comonomers.

[Physical Properties of the Block Copolymer]

Physical properties and other characteristics of the poly (arylene thioether) block copolymer useful in the practice of this invention will next be described in detail from the viewpoint of processability, melt stability, crystallinity and the like.

(1) Processability

The melting point of PTK homopolymer is about 360° C. The extent of a reduction in the melting point due to copolymerization with another monomer of a different kind, $\Delta Tm = [360°\ C. - Tm$ (melting point of copolymer)] is generally proportional to the extent of a reduction in the melt processing temperature. Accordingly, $\Delta Tm$ can be used as an index indicative of processing temperature reducing effect, namely, processability improving effect.

$\Delta Tm$ may preferably be 10°–80° C. more preferably 20°–70° C., most preferably 30°–60° C. If $\Delta Tm$ is lower than 10° C., there is a potential problem that the processability improving effect may not te sufficient. If $\Delta Tm$ is higher than 80° C., there is another potential problem that the block copolymer may lose the characteristics as a heat-resistant resin. $\Delta Tm$ outside the above range is therefore not preferred.

(2) Crystallinity

One of great features of the block copolymers according to this invention resides in that they have not only excellent processability but also high crystallinity. Crystallinity imparts high heat resistance to a copolymer. To have a block copolymer equipped with high heat resistance, it is essential that the block copolymer has sufficient crystallinity.

In general, melt crystallization enthalpy $\Delta Hmc$ is proportional to the degree of crystallization when a molten polymer undergoes crystallization. On the other hand, melt crystallization temperature Tmc serves as an index of the readiness of crystallization. Therefore, the melt crystallization enthalpy $\Delta Hmc$ (400° C.) and melt crystallization temperature Tmc (400° C.) of a block copolymer according to this invention as measured when cooled at a rate of 10° C./min immediately after being heated to 400° C. in an inert gas atmosphere by means of a differential scanning calorimeter (hereinafter abbreviated as "DSC") can be used as indices of the crystallinity of the block copolymer.

In addition, residual melt crystallization enthalphy, $\Delta Hmc$ (400° C./10 min) and melt crystallization temperature, Tmc (400° C./10 min) measurable upon determination of the residual crystallinity, both of which will be described subsequently, can be used as an index of not only melt stability but also crystallinity.

The block copolymers of this invention may have a melt crystallization enthalpy, $\Delta Hmc$ (400° C.) of at least 15 J/g, preferably at least 20 J/g, and more preferably at least 25 J/g. On the other hand, Tmc (400° C.) may desirably be at least 180° C., with at least 200° C. being more preferred. Block copolymers having $\Delta Hmc$ (400° C.) smaller than 15 J/g or Tmc (400° C.) lower than 180° C. may have insufficient heat resistance as heat resistant polymers and are hence not preferred.

(3) Melt Stability

The greatest feature of the block copolymers according to this invention resides in that they have melt stability sufficient to permit the application of conventional melt processing techniques.

Polymers of poor melt stability tend to lose their crystallinity or to undergo crosslinking or carbonization, resulting in a rapid increase in melt viscosity, upon melt processing.

It is hence possible to obtain an index of the melt processability of a polymer by investigating the residual crystallinity of the polymer after holding it at an elevated temperature of its melt processing temperature or higher for a predetermined period of time. The residual crystallinity can be evaluated quantitatively by measuring the melt crystallization enthalpy of the polymer by a DSC.

Specifically described, it is possible to use as indices of the melt stability of a block copolymer its residual melt crystallization enthalphy, $\Delta Hmc$ (400° C./10 min) and melt crystallization temperature, Tmc (400° C./10 min), which are determined at a cooling rate of 10° C./min after the block copolymer is held at 50° C. for 5 minutes in an inert gas atmosphere, heated to 400° C. at a rate of 75° C./min and there held for 10 minutes at 400° C. which is higher than the melt processing temperature of the block copolymer.

In the case of a copolymer having poor melt stability, it undergoes crosslinking or the like under the above conditions, namely, when it is held for 10 minutes at the high temperature of 400° C., whereby the copolymer loses its crystallinity substantially.

The block copolymers of this invention are polymers having the physical properties that their residual melt crystallization enthalpies, $\Delta Hmc$ (400° C./10 min) are at least 10 J/g, more preferably at least 15 J/g, most preferably at least 20 J/g and their melt crystallization temperatures, Tmc (400° C./10 min) are at least 170° C., more preferably at least 180° C., most preferably at least 190° C.

A block copolymer, whose $\Delta Hmc$ (400° C./10 min) is smaller than 10 J/g or whose Tmc (400° C./10 min) is lower than 170° C., tends to lose its crystallinity or to induce a melt viscosity increase upon melt processing, so that difficulties are encountered upon application of conventional melt processing techniques.

Further, the ratio of melt crystallization enthalpy to residual melt crystallization enthalpy, namely, $\Delta Hmc$ (400° C.)/$\Delta Hmc$ (400° C./10 min) can also be used as an index of melt stability. Deterioration by heat becomes smaller as this ratio decreases. Therefore, it is preferable that $\Delta Hmc$ (400° C./10 min) is at least 10 J/g and the above ratio is 5 or smaller, more preferably 3 or smaller.

(4) Melt Viscosity

In this invention, the melt viscosity $\eta^*$ of each copolymer is used as an index of its molecular weight.

Specifically, a polymer sample is filled in a Capirograph manufactured by Toyo Seiki Seisaku-Sho, Ltd. and equipped with a nozzle having an inner diameter of 1 mm and an L/D ratio of 10/1 and is preheated at 350° C. for 5 minutes. Its melt viscosity $\eta^*$ is measured at a shear rate of 1,200/sec.

The block copolymers of the present invention have a melt viscosity $\eta^*$ of 50–100,000 poises, preferably 100–50,000 poises, more preferably 150–10,000 poises.

Those having a melt viscosity $\eta^*$ lower than 50 poises have an unduly small molecular weight so that their flowability is too high to conduct melt-spinning by conventional melt processing techniques. Even if fibers are obtained, their physical properties are considerably inferior. Such low melt viscosities are therefore not preferred. On the other hand, those having a melt viscosity $\eta^*$ higher than 100,000 poises have an unduly large molecular weight so that their flowability is too low to apply conventional melt processing techniques. Such high melt viscosities are therefore not preferred either.

Production Process of Block Copolymers

Processes for the production of the block copolymers include:

(1) addition of a dihalogenated aromatic compound consisting principally of a 4,4'-diihalobenzophenone and an alkali metal sulfide to PATE blocks (Y) prepared in advance, whereby they are reacted to form PTK blocks (X); and (2) chemical coupling of PTK blocks (X) and PATE blocks, (Y), said blocks (X) and (Y) having been prepared separately.

A. Raw Materials for Block Copolymers

In the process for the production of a block copolymer of this invention, are primarily employed an alkali metal sulfide and a dihalogenated aromatic compound as principal raw materials for the polymer as well as an organic amide solvent and water, including water of hydration, as reaction polymerization media.

(1) Alkali Metal Sulfide

Illustrative examples of the alkali metal sulfide useful in the practice of this invention include lithium sulfide, sodium sulfide, potassium sulfide, rubidium sulfide, cesium sulfide and mixtures thereof.

These alkali metal sulfides may each be used as a hydrate or aqueous mixture or in an anhydrous form.

(2) Dihalogenated Aromatic Compound

The dihalogenated aromatic compound employed in the present invention for the formation of the PTK block (X), including a PTK prepolymer, consists principally of one or more dihalobenzophencnes, i.e., 4,4'-dichlorobenzophenone and/or 4,4'-dibromobenzophenone.

The dihalogenated aromatic compound used for the formation of the PATE block (Y), including a PATE prepolymer, consists principally of a dihalobenzene such as p-dichlorobenzene or m-dichlorobenzene.

As other copolymerizable dihalogenated aromatic compounds, may be mentioned, for example, dihalobenzophenones other than the 4,4'-isomers, dihaloalkylbenzenes, dihalobiphenyls, dihalodiphenyl sulfones, dihalonaphthalenes, bis(halogenated phenyl)methanes, dihalopyridines, dihalothiophenes and dihalobenzonitriles, and mixtures thereof.

It is also permissible to introduce a partially cross-linked and/or branched structure by causing a trihalogenated or higher polyhalogenated compound to exist in a reaction system in such a small amount that the processability and physical properties of the copolymer may not be impaired to any substantial extent.

(3) Organic Amide Solvent

As organic amide solvents useful for the present invention, may be mentioned N-methylpyrrolidone, N-ethylpyrrolidone, hexamethylphosphoric triamide, tetramethylurea, dimethylimidazolidione, dimethylacetamide, a mixed solvent thereof, etc.

B. Polymerization Process and Reaction Conditions

To prepare the PATE prepolymer in this invention, any process conventionally known for the polymerization of PATE can be adopted. However, for the reaction in which the PTK is formed in the presence of the PATE prepolymer, for the preparation of the PTK prepolymer and for the reaction in which the PTK prepolymer and PATE prepolymer are combined together to form a block copolymer, it is necessary to conduct the reactions under special conditions, namely, by maintaining a high water content in the reaction systems, controlling the monomer compositions suitably, regulating the polymerization temperatures appropriately, the limiting reaction time at high temperatures. It is effective for the production of block copolymers having more preferable physical properties, for example, to choose a suitable material for the reactor and to apply stabilization treatment in a final stage of the reaction.

Unless these reaction conditions are suitably controlled, it is difficult to provide crystalline block copolymers having melt stability suitable for conventional melt processing.

<Preparation Processes of Prepolymers>

(1) PATE Prepolymer

The PATE prepolymer employed as a raw material for the block copolymer of this invention can be prepared by having an alkali metal sulfide and a dihalogenated aromatic compound, which consists principally of a dihalobenzene, undergo a dehalogenation/sulfuration reaction in the presence of water in an organic amide solvent under the following conditions (a)–(c):

(a) The ratio of the water content to the amount of the charged organic amide solvent is within a range of 0.2–5 (mol/kg), preferably 0.5–4.5 (mol/kg).

(b) The ratio of the amount of the charged dihalogenated aromatic compound to the amount of the charged alkali metal sulfide is within a range of 0.8–1.05 (mol/mol), preferably 0.8–1.0 (mol/mol), more preferably 0.85–0.95 (mol/mol).

(c) The reaction is conducted at a temperature within a range of 200°–280° C., preferably 210°–250° C., and should be continued until the average polymerization degree of the resulting prepolymer reaches at least 10, preferably 20 or greater.

When the ratio of the amount of the charged dihalogenated aromatic compound to the amount of the charged alkali metal sulfide is set at 0.95 or greater (mol/mol), notably, 1.0 or greater (mol/mol) as the above condition (b), the reaction product may be treated further with the alkali metal sulfide to prepare a PATE prepolymer containing more thiolate groups as reactive terminal groups. The PATE prepolymer may contain some crosslinked structure and/or branched structure introduced typically by allowing a trihalobenzene or higher polyhalobenzene to present in a small amount in the polymerization reaction system.

The PATE prepolymer is supposed to be a polymer having an average polymerization degree of at least 10, preferably at least 20 in view of the physical properties required for the block copolymer to be obtained.

In this invention, the number average molecular weight of the PATE block in the stage of the prepolymer is determined by applying the method which relies upon the numbers of terminal thiol groups, thiolate groups and terminal halogen atoms.

Incidentally, it is preferred from the standard point of reactivity that the ratio of terminal thiolates, including thiol groups if any, to terminal halogen atoms in the PATE prepolymer chain is at least 0.3 (mol/mol), more preferably at least 0.5 (mol/mol). If this ratio is smaller than 0.3, the reactivity at the terminals of the PATE prepolymer is insufficient thereby to make it difficult to obtain a block copolymer.

In passing, among the recurring units of the formula

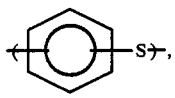

the paraphenylene sulfide unit of the formula

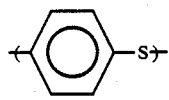

is preferred because it can afford block copolymers excellent especially from the viewpoint of crystallinity, melt stability, heat resistance, mechanical properties and the like.

(2) PTK prepolymer

The PTK prepolymer employed as a raw material for the block copolymer of this invention can be prepared in the following manner.

Namely, the PTK prepolymer can be prepared by having an alkali metal sulfide and a dihalogenated aromatic compound, which consists principally of 4,4'-dichlorobenzophenone and/or 4,4'-dibromobenzophenone, undergo a dehalogenation/sulfuration reaction in the presence of water in an organic amide solvent under the following conditions (a)-(b):

(a) The ratio of the water content to the amount of the charged organic amide solvent is within a range of 2.5-15 (mol/kg).

(b) The reaction is conducted at a temperature within a range of 60°-300° C. with the proviso that the reaction time at 210° C. and higher is not longer than 10 hours.

The PTK prepolymer may contain some crosslinked structure and/or branched structure introduced typically by allowing a trihalobenzophenone or higher polyhalobenzophenone to present in a small amount in the polymerization reaction system. <Production Process of Block Copolymers (Process No. 1)>

As a production process for each block copolymer usable in this invention, may be described the process in which a PATE prepolymer is prepared in advance and at least one PTK block is formed in the presence of the PATE prepolymer.

Practically, this process is the following two-step process:

A process for the production of a poly(arylene thioether) block copolymer comprising (X) at least one PTK block and (Y) at least one PATE block, which comprises at least the following two steps:

(i) heating in the presence of water an organic amide solvent containing a dihalogenated aromatic compound, which consists principally of a dihalobenzene, and an alkali metal sulfide, whereby a reaction mixture containing a PATE prepolymer having predominant recurring units of the formula

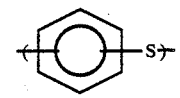

and reactive terminal groups is formed, and (ii) mixing the reaction mixture, which has been obtained in the step (i), with a dihalogenated aromatic compound consisting principally of at least one dihalobenzophenone selected from 4,4'-dichlorobenzophenone and 4,4'-dibromobenzophenone, an alkali metal sulfide, an organic amide solvent and water and heating the resultant mixture to form a PTK block having predominant recurring units of the formula

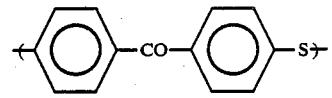

wherein the —CO— and —S— are in the para position to each other, said first and second steps (i) and (ii) being conducted under the following conditions (a)-(f):

(a) in the first step i), the ratio of the water content to the amount of the charged organic amide solvent being 0.2-5 (mol/kg), the ratio of the amount of the charged dihalogenated aromatic compound to the amount of the charged alkali metal sulfide being 0.8-1.05 (mol/mol), and the polymerization being conducted until the average polymerization degree of the poly(arylene thioether) prepolymer becomes at least 10, (b) in the second step, the ratio of the water content to the amount of the charged organic amide solvent being controlled within a range of 2.5-15 (mol/kg), (c) in the second step, the ratio of the total amount of the charged dihalogenated aromatic compound, said total amount being the amount of the whole dihalogenated aromatic compounds including the dihalobenzene and the dihalobenzophenone to the total amount of the charged alkali metal sulfide, said latter total amount being the total amount of the alkali metal sulfide charged in the first step (i) and that charged in the second step (ii), being controlled within a range of 0.95-1.2 (mol/mol), (d) the ratio of the charged amount of the dihalogenated aromatic compound consisting principally of the dihalobenzophenone to the charged amount of the dihalogenated aromatic compound consisting principally of the dihalobenzene being controlled within a range of 0.1–10 (mol/mol), (e) the reaction of the second step (ii) being conducted within a temperature range of 150°–300° C. with the proviso that the reaction time at 210° C. and higher is not longer than 10 hours, and (f) in the second step ii), the reaction is conducted until the melt viscosity of the resulting block copolymer becomes 50–100,000 poises as measured at 350° C. and a shear rate of 1,200/sec.

<Production Process of Block Copolymers (Process No. 2)>

As another production process for each block copolymer according to this invention, may be described the process in which PATE prepolymer and PTK prepolymers are prepared in advance and are then reacted to combine them together. This process is practically the following 3-step process:

A process for the production of a poly(arylene thioether) block copolymer comprising (X) at least one PTK block and (Y) at least one PATE block, which comprises at least the following three steps:

i) heating in the presence of water an organic amide solvent containing a dihalogenated aromatic compound, which consists principally of a dihalobenzene, and an alkali metal sulfide, whereby a first reaction mixture containing a PATE prepolymer having predominant recurring units of the formula

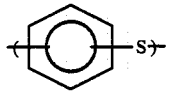

and reactive terminal groups is formed, (ii) heating in the presence of water an organic amide solvent containing a dihalogenated aromatic compound, which consists principally of at least one dihalobenzophenone selected from 4,4′-dichlorobenzophenone and 4,4′-dibromobenzophenone, an alkali metal sulfide, whereby a second reaction mixture containing a PTK prepolymer having predominant recurring units of the formula

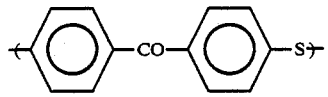

wherein the —CO— and —S— are in the para position to each other and reactive terminal groups is formed, and (iii) mixing and reacting the first reaction mixture, which has been obtained in the first step (i) and contains the PATE prepolymer, with the second reaction mixture obtained in the second step (ii) and containing the PTK prepolymer;

said first through third steps (i)–(iii) being conducted under the following conditions (a)–(g):

(a) in the first step i), the ratio of the water content to the amount of the charged organic amide solvent being 0.2–5 (mol/kg), the ratio of the amount of the charged dihalogenated aromatic compound to the amount of the charged alkali metal sulfide being 0.8–1.05 (mol/mol), and the polymerization being conducted until the average polymerization degree of the PATE prepolymer becomes at least 10, (b) in the second step, the ratio of the water content to the amount of the charged organic amide solvent being controlled within a range of 2.5–15 (mol/kg) and the reaction being conducted within a temperature range of 60°–300° C. with the proviso that the reaction time at 210° C. and higher is not longer than 10 hours, (c) in the third step, the ratio of the water content to the amount of the charged organic amide solvent being controlled within a range of 2.5–15 (mol/kg), (d) in the third step, the ratio of the total amount of the charged dihalogenated aromatic compound, said total amount being the amount of the whole dihalogenated aromatic compounds including the dihalobenzene and the dihalobenzophenone to the total amount of the charged alkali metal sulfide, said latter total amount being the total amount of the alkali metal sulfide charged in the first step (i) and that charged in the second step (ii), being controlled within a range of 0.95–1.2 (mol/mol), (e) the ratio of the whole poly(arylene thioether) prepolymer to the whole poly(arylene thioether-ketone) prepolymer being controlled at 0.05–5 by weight, (f) the reaction of the third step (iii) being conducted within a temperature range of 150°–300° C. with the proviso that the reaction time at 210° C. and higher is not longer than 10 hours, and (g) in the third step (iii), the reaction is conducted until the melt viscosity of the resulting block copolymer becomes 50–100 000 poises as measured at 350° C. and a shear rate of 1,200/sec.

In the process for the production of each of the PTK prepolymer and the block copolymer, it is preferable to use, as a reactor (including equipment employed for provisional procedures of the polymerization reaction, for example, those required for dehydration and the like), a reactor made of a corrosion-resistant material at least at portions with which the reaction mixture is brought into direct contact. The corrosion-resistant material is supposed to be inert so that it does not react with the reaction mixture. Preferred examples of the corrosion-resistant material include titanium materials such as titanium and titanium-containing alloys.

Further, in a final stage of the reaction, at least one halogen-substituted aromatic compound having at least one substituent group having electron-withdrawing property at least equal to —CO— group (preferably, 4,4′-dichlorobenzophenone and/or 4,4′-dibormobenzophenone employed as a monomer) may be added to the reaction system to react it to the above-obtained block copolymer, whereby a block copolymer improved further in melt stability can be obtained. Here, it should be noted that the term "final stage of the reaction" as used herein means a period after the lapse of about one third of the overall period of the reaction from the initiation thereof. Further, the amount of the halogen-substituted aromatic compound charged in the final stage of the reaction is not included in the above-described amount of the charged dihalogenated aromatic compound.

Thermoplastic Materials

The thermoplastic material usable in the present invention is obtained by blending the poly(arylene thioether) block copolymer (Component A) optionally with at least one other thermoplastic resin (Component B) and/or at least one filler (Component C) in order to modify and/or improve various physical properties of the block copolymer, such as mechanical properties, electrical properties, thermal properties and chemical properties, to modify and/or improve its processability and to reduce the production cost of the fibers. In addition, the composition may also be added with a basic compound (Component D) which is a melt stabilizer for Component A, optionally along with an antioxidant (Component E).

Other components of the thermoplastic material usable in the present invention will hereinafter be described specifically. [Component B . . . Thermoplastic Resin]

Each thermoplastic material usable in the present invention may contain as Component B at least one thermoplastic resin in a proportion of 0–50 parts by weight, preferably 0–40 parts by weight, more preferably 0–30 parts by weight, per 100 parts by weight of Component A. If the proportion of Component B exceeds 50 parts by weight, the mechanical properties, especially the durability at elevated temperatures will be impaired.

As exemplary thermoplastic resins useful as Component B in the present invention, ma be mentioned resins such as poly(arylene thioethers), poly(arylene thioether-ketones), aromatic polyether ketones, e.g., PEEKs and PEKs, polyamides (including Aramids), polyamideimides, polyesters (including aromatic polyesters and liquid crystalline polyesters), aromatic polysulfones, e.g., polysulfones and polyether sulfones, polyether imides, polyarylenes, poly(phenylene ethers), polycarbonates, polyester carbonates, polyacetals, fluoropolymers such as polytetrafluoroethylene, polyolefins, polystyrenes, polymethyl methacrylates, and ABS; as well as elastomers such as fluororubbers, silicone rubbers, olefin rubbers, acrylic rubbers, polyisobutylenes (including butyl rubber), hydrogenated SBR, polyamide elastomers and polyester elastomers. These thermoplastic resins may be used either singly or in combination.

Of the above thermoplastic resins, poly(arylene thioethers), particularly poly(arylene thioethers) containing predominant recurring units of the formula

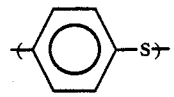

(in a proportion of at least 50 wt. %), poly(arylene thioether-ketones) containing predominant recurring units of the formula

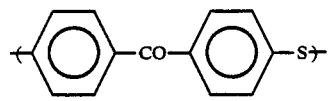

wherein the —CO— and —S— are in the para position to each other, and mixtures thereof show excellent compatibility when blended with the block copolymer of this invention, judging from the glass transition temperatures of the blends as measured by a DSC, their crystallization temperatures $T_{c1}$ from a glass state, their crystallization temperature $T_{c2}$ from a molten state and the peak behaviours of the melting points of their crystals. These compositions have also been found to have the marked feature that they can provide transparent moldings under amorphous conditions when they are free of any filler.

[Component C . . . Filler]

Each thermoplastic material usable in the present invention may contain as Component C at least one filler in a proportion of up to 10 parts by weight per 100 parts by weight of Component A. If the proportion of Component C exceeds 10 parts by weight, there is a potential problem that the processability may be reduced. Such a large proportion is therefore not preferred.

As exemplary fillers useful as Component C in the invention, may be mentioned fibrous fillers such as glass fibers, carbon fibers, graphite fibers, silica fibers, alumina fibers, zirconia fibers, silicon carbide fibers and Aramid fibers as well as whiskers and the like including potassium titanate whiskers, calcium silicate (including wollastonite) whiskers, calcium sulfate whiskers, carbon whispers, silicon nitride whiskers and boron whiskers; and also inorganic fillers such as talc, mica, kaolin, clay, silica, alumina, silica-alumina, titanium oxide, iron oxides, chromium oxide, calcium carbonate, calcium silicate, calcium phosphate, calcium sulfate, magnesium carbonate, magnesium phosphate, silicon, carbon (including carbon black), graphite, silicon nitride, molybdenum disulfide, glass, hydrotalcite, ferrite, samarium-cobalt, neodium-iron-boron, etc., all in a powder form.

These fillers may be used either singly or in combination.

[Component D . . . Basic Compound]

Addition of a specific basic compound to the thermoplastic material in the present invention can reduce or prevent the melt viscosity increase or crystallinity reduction due to thermal modification and/or thermal deterioration, the sticking of thermal decomposition products at resin residence areas of melt processing equipment, etc. upon melt processing. In addition, these stabilizing effects will be enhanced further by combined use of the basic compound with a specific antioxidant.

As basic compounds, non-oxidative, heat-resistant and low volatile compounds, more specifically, the hydroxides, oxides and aromatic carboxylates of Group IIA metals of the periodic table other than magnesium, and aromatic carboxylates, carbonates, hydroxides, phosphates (including condensation products) and borates (including condensation products) of Group IA metals of the periodic table may be mentioned.

Among these basic compounds, the hydroxides and oxides of calcium and barium, as well as the lithium, sodium and potassium salts of aromatic carboxylic acids such as naphthalene monocarboxylic acid and polycarboxylic acids, arylbenzoic acids, benzene monocarboxylic acid and polycarboxylic acids and hydroxybenzoic acids are preferred. Among the above-exemplified basic compounds, the hydroxides of calcium and barium are particularly preferred.

The proportion of the basic compound in the thermoplastic material of this invention is 0.1–10 parts by weight, preferably 0.2–5 parts by weight, more preferably 0.3–2 parts by weight, all, per 100 parts by weight of the poly(arylene thioether) block copolymer. If the proportion of the basic compound is smaller than 0.1 part by weight, its stabilizing effects cannot be exhibited to any sufficient degree. On the other hand, any proportions greater than 10 parts by weight involve a potential problem that the block copolymer may be decomposed or electrical properties and the like may be deteriorated.

[Component E ... Antioxidant]

As antioxidants used in combination with the basic compound, radical chain terminators and peroxide decomposers, more specifically, hindered phenolic compounds, phosphorus compounds and hindered amine compounds may be mentioned.

As exemplary hindered phenolic compounds, may typically be mentioned 1,3,5-trimethyl-2,4,6-tris(3,5-di-t-butyl-4-hydroxybenzyl)benzene and compounds analogous thereto as well as octadecyl-3-(3,5-di-t-butyl-4-hydroxyphenyl)propionate, pentaerythrityltetrakis[3-(3,5-di-t-butyl-4-hydroxyphenyl)propionate] and 2,2-thio-diethylenebis[3-(3,5-di-t-butyl-4-hydroxyphenyl)-propionate].

As phosphorus compounds, those containing a trivalent phosphorus atom are preferred.

As typical examples of such trivalent phosphorus compounds, tris(2,4-di-t-butylphenyl)phosphite, bis(2,6-di-t-butyl-4-methylphenyl)pentaerythritol diphosphite, distearylpentaerythritol diphosphite and tetrakis(2,4-di-t-butylphenyl) 4,4'-biphenylenediphosphinate may be mentioned.

As typical exemplary hindered amine compounds, poly{[6-(1,1,3,3-tetramethylbutyl)imino-1,3,5-triazin-2,4-diyl][(2,2,6,6-tetramethyl-4-piperidyl)imino]hexamethylene [(2,2,6,6-tetramethyl-4-piperydyl)iminol]} and compounds analogous thereto may be mentioned.

As antioxidants, low-volatile and decomposition-resistant ones, particularly, the above-described phosphorus compounds are preferred. These antioxidants may be used either singly or in combination. When used in combination, the combination of a radical chain terminator and a peroxide decomposer is preferred.

The proportion of the anti-oxidant in the composition of this invention is 0–10 parts by weight, preferably 0.01–5 parts by weight, more preferably 0.1–2 parts by weight, per 100 parts by weight of the poly(arylene thioether) block copolymer. If the proportion of the anti-oxidant is smaller than 0.01 part by weight, it cannot exhibit a sufficient stabilizing effect. On the contrary, any proportions greater than 10 parts by weight involve a potential problem that more gas components may be evolved and/or electrical properties and the like may be deteriorated.

[Optional Components]

Each thermoplastic material usable in the present invention may optionally contain, as needed, additives such as light stabilizers, rust inhibitors, lubricants, surface-roughening agents, nucleating agents, mold releasing agents, colorants, coupling agents, flashing preventives and/or antistatic agents.

Zinc compounds such as zinc oxide and zinc carbonate are particularly preferred as scavengers for corrosive gas.

Blending Method

Thermoplastic materials usable in the present invention can each be prepared by one of various conventional blending methods including the blending of the individual components by a dry blending method.

Although all the components of the thermoplastic material including optional components may be added simultaneously, they can also be blended in an arbitrary order. For instance, after Component A and Component D are mixed in advance, the mixture thus-obtained is added with the other components.

Component A and Component D are blended in advance by a dry-blending method in which Component D in the form of a dry powder is added to Component A, or by a wet method in which Component D in a wet form such as a solution or a slurry is added to Component A and the solvent is then removed to dry the resultant mixture. These mixtures can be separately molten and kneaded further, as needed, to provide molten and kneaded mixtures. In this case, Component E may, also be used jointly as desired.

When Component D is blended after addition of Component B and/or Component C to Component A, their blending may be carried out in the same manner as the above-described blending method for Component D.

Dry blending method is preferred from the viewpoint that no drying step be required.

Production Method of Fibers

The fibers of this invention can be produced by charging a thermoplastic material, which is the poly(arylene thioether) block copolymer or a composition of the poly(arylene thioether) block copolymer, at least one other thermoplastic resin and/or at least one filler, for example, into a spinneret-equipped extruder in the air or preferably, in an inert gas atmosphere, extruding the thermoplastic material at an extrusion temperature of 300°–400° C. through a spinneret, stretching the resultant fibers 1.2–8 times within a temperature range of 90°–190° C. and then heat-setting the thus-stretched fibers at 100°–340° C. for 0.1–1,000 seconds. Upon extrusion through the spinneret, fibers are generally taken up at a draw down ratio (the ratio of the take-up speed of spun fibers to the discharge rate of the resin from the spinneret) of from 1–50,000 times, preferably 5–5,000 times.

If the extrusion temperature from the spinneret is lower than the above temperature range, it is difficult to achieve smooth spinning. If it is too high on the contrary, end breakages and deterioration of the resin are induced. Extrusion temperatures outside the above range are hence not preferred. The fibers extruded from the spinneret are stretched in the solid state and orientation is therefore imparted.

The stretching is carried out at a high temperature not higher than the melting point of the poly(arylene thioether) block copolymer, preferably at 90°–190 C. The stretching step may be performed, for example, by stretching melt-spun and unstretched fibers in a dry heat bath or wet heat both of a high temperature or on a hot plate of a high temperature. If the stretching temperature is outside the specified temperature range, end breakages, fuzzing and/or melt bonding tends to take place. Stretching temperatures outside the above temperature range are hence not preferred.

The draw ratio is 1.2–8 times. Draw ratios smaller than 1.2 times are difficult to obtain high-strength fibers. On the other hand, draw ratios greater than 8 times encounter difficulties in stretching and induce end breakages and/or fuzzing. Draw ratios outside the above range are therefore not preferred. By applying heat setting subsequent to stretching, fibers having high strength and excellent dimensional stability can be obtained.

Incidentally, the spinning extruder employed here may preferably be made of a corrosion resistant metal at areas where the extruder is brought into contact with the molten resin. A vented spinning extruder is thought to be more preferred.

Block copolymers produced in the above manner feature high melt stability sufficient to permit application of conventional melt-processing techniques. Further, fibers produced from such block copolymers feature high heat resistance at elevated temperatures, namely, small reduction of strength even when used at elevated temperatures for a long period of time.

Physical Properties of Fibers

The poly(arylene thioether) block copolymer fibers according to this invention generally have a fiber diameter of 0.5-1 000 μm, preferably 1-300 μm and have the following excellent physical properties:

(a) tensile strength being at least 10 kg/mm$^2$ when measured at 23° C.;

(b) tensile elongation being at least 5% when measured at 23° C.;

(c) heat shrinkage (200° C./30 min) being at most 20%.

(Measuring methods of Physical Properties)

Tensile Strength

JIS-L1013 was followed (sample length: 300 mm; drawing rate: 300 mm/min).

Tensile Elongation

JIS-L1013 was followed.

Heat Shrinkage (200° C./30 min)

After aging each fiber sample at 200° C. for. 30 minutes, the degree of shrinkage of the sample was determined.

Application Fields

The fibers according to this invention can be used, for example, as industrial filters, heat-insulating materials, reinforcing fibers, insulating tapes, insulating cloths, fireproof wears, high-temperature gloves, prepreg fibers, prepreg tapes, tension members for optical-fiber cables, various textiles, etc.

ADVANTAGES OF THE INVENTION

According to this invention, fibers having excellent in strength, heat resistance and like are provided.

The fibers of this invention use, as a raw material, a high-crystalline block copolymer, which has high melt stability enough for permitting application of conventional melt processing techniques, has a sufficient molecular weight and can be produced at an economical cost, either alone or as a thermoplastic material added with one or more components with a view toward modifying or otherwise changing the block copolymer. Therefore they have practical mechanical properties, especially, excellent durability at elevated temperatures.

EMBODIMENTS OF THE INVENTION

The present invention will hereinafter be described in further detail by the following examples, experiments and comparative examples. It should however be borne in mind that the present invention is not limited only to the following examples and experiments so long as they do not depart from the spirit or scope of the invention.

[Synthesis Experiment 1](Synthesis of block copolymer by Production Process No. 1)

Synthesis of PATE prepolymer)

A titanium-lined reactor was charged with 225.5 kg of hydrated sodium sulfide (water content: 53.9 wt. %) and 500 kg of N-methylpyrrolidone (hereinafter abbreviated as "NMP"). While gradually heating the contents to 187° C. in a nitrogen gas atmosphere, 104 kg of an NMP solution, which contained 86.3 kg of water, and 34.9 moles of hydrogen sulfide were distilled out. Thereafter, 171.8 kg of p-dichlorobenzene (hereinafter abbreviated as "PDCB") and 167 kg of NMP were then fed, followed by polymerization at 220° C. for 10 hours (PDCB/sodium sulfide=0.9 mol/mol; water content/NMP=3 mol/kg).

After cooling to 50° C., a portion of the slurry of the reaction liquid containing the prepolymer was sampled out and the concentration of active terminal groups was measured by the method which will be set out subsequently.

The concentration of terminal thiolate groups and terminal thiol groups was $462 \times 10^{-6}$ equivalent per gram of the prepolymer, while the concentration of chlorine groups was $34 \times 10^{-6}$ equivalent per gram of the prepolymer. The number average molecular weight of the prepolymer as determined from the numbers of those terminal groups was 4032 (average polymerization degree: 37).

Analytical methods

Analysis of Terminal Thiol Groups or Thiolate Groups>

After completion of the polymerization of the prepolymer, a portion of the slurry as the reaction liquid was sampled out and then poured into water to have the polymer precipitated. The prepolymer was collected by filtration, washed in distilled water and then treated with dilute hydrochloric acid, whereby terminal thiolate groups were converted into thiol groups. The resulting polymer was washed for 30 minutes in pure water and for additional 30 minutes in acetone and then dried at room temperature under reduced pressure in a vacuum drier, thereby obtaining a polymer sample. Right after that, about 10 mg to 1 g of the polymer sample was weighed and placed in a stopper-equipped test tube, followed by the addition of 2.5 ml of an acetone solution consisting of 2.5 ml of acetone and 50 mmol of iodoacetamide. The test tube was hermetically closed and then heated at 100° C. for 60 minutes. The test tube was thereafter cooled with water and opened. The liquid-phase portion was separated. The absorbance at 450 nm (i.e., the absorbance of iodine) was measured by means of a spectrophotometer.

Using a calibration curve prepared in advance with respect to the thiol compound

as a standard, the concentration of terminal thiol groups was calculated from the absorbance. (The amount of each sample should be chosen suitably so that the concentration of thiol groups in a corresponding acetone slurry falls within a range of 0.1–0.3 mmol.) Analysis was conducted three times on the same dried sample to determine the average value of the concentration of terminal thiol groups.

<Analysis of Terminal Halogen Groups>

Quantitative analysis of terminal halogen atoms was conducted using an X-ray fluorescence analyzer (model: "3080E2"; manufactured by Rigaku Denki Kabushiki Kaisha)

<Determination of Number Average Molecular Weight>

Each number average molecular weight was determined from the data of terminal thiol groups, including thiolate groups, and halogen groups in accordance with the following equation:

$$\text{Number average molecular weight} = \frac{\text{Sample weight (g)}}{\frac{1}{2}(\text{Number of terminal thiol groups} + \text{Number of terminal halogen groups})}$$

(Synthesis of Block Copolymer)

A titanium-lined reactor containing 957.4 kg of the reaction liquid slurry of the PATE prepolymer was charged with 29.8 kg of hydrated sodium sulfide (water content: 54.0 wt. %), 80.5 kg of 4,4'-dichlorobenzophenone (hereinafter abbreviated as "DCBP"), 328 kg of NMP and 127.8 kg of water After the reactor being purged with nitrogen gas, the contents were heated to 260° C. at which they were polymerized for 2 hours.

The reaction conditions upon synthesis of the block copolymer were as follows:

(1) The molar ratio of the total amount of the charged dihalogenated aromatic compounds [the sum of the amount of PDCB charged upon synthesis of the prepolymer and the amount of DCBP charged upon synthesis of the block copolymer] to the total amount of the charged alkali metal sulfide [the sum of the amount of effective sodium sulfide charged upon synthesis of the prepolymer and the amount of sodium sulfide charged upon synthesis of the block copolymer] was 1.01.

(2) The ratio of the amount of DCBP to the amount of PDCB, charged upon synthesis of the prepolymer, was 32:68 by weight.

(3) The ratio of the water content to the organic amide (NMP) was about 10 mol/kg.

(Collection of block copolymer)

The resultant reaction mixture in the form of a slurry was diluted with a substantially equal amount of NMP and the granular polymer thus obtained was collected by a screen having an opening size of 150 μm (100 mesh). The polymer was washed three times with methanol and further three times with water, and then dried at 100° C. for 24 hours under reduced pressure to obtain a block copolymer (Block Copolymer B₁). The collection rate of the Block Copolymer B₁ was 75%.

(Inherent Properties of Block Copolymer)

Block Copolymer B₁ was in the form of pearl-like granules having an average size of 680 μm and had a bulk density of 0.58 g/dl.

By an infrared (IR) spectrum analysis, a strong absorption peak attributed to ketone groups was observed at 1640 cm⁻¹ Wide angle X-ray diffraction which was conducted using "RAD-B System" (manufactured by Rigaku Denki Kabushiki Kaisha) showed a diffraction pattern corresponding to the block copolymer, said pattern being apparently different from that of the corresponding PATE homopolymer or PTK homopolymer or from that of a blend thereof.

The content of sulfur in Block Copolymer B₁ was determined by the combustion flask method and ion chromatography (IC method). Namely, Block Copolymer B₁ was caused to burn in a flask and the resulting combustion gas was absorbed in aqueous hydrogen peroxide solution, whereby the sulfur content of the block copolymer was converted into sulfate groups. The sulfur content was then quantitatively analyzed using an ion chromatographic apparatus equipped with an electrical conductivity detector ("IC-500"; manufactured by Yokogawa Electric Corporation).

The weight fraction $W_6$ (wt. %) of the PATE recurring units

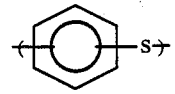

in the block copolymer can be calculated in accordance with the following equation:

$$W_b = 100 \times \frac{\text{Weight fraction of sulfur in block copolymer, }(W) - \text{Weight fraction of sulfur in PTK recurring unit, }(W_1)}{\text{Weight fraction of sulfur in PATE recurring unit, }(W_2) - \text{Weight fraction of sulfur in PTK recurring unit, }(W_1)}$$

By introducing a measured value W=24.3% and calculated values $W_1$=15.01% and $W_2$=29.63% into the above equation, Wb was determined to be 63.5 %.

(Physical Properties of Block Copolymer)

Physical properties of the block copolymer are as follows:
Melt viscosity: 180 poises
Transition temperature:
  Tg: 100° C.
  Tm: 302° C. and 323 ° C.
Melt crystallization temperature:
  Tmc (400° C.): 263° C.
  Tmc (400° C./10 min): 230° C.
Melt crystallization enthalpy: ΔHmc (400° C.): 53 J/g
Residual melt crystallization enthalpy: ΔHmc (400° C./10 min): 42 J/g Incidentally, Tg (glass transition temperature) and Tm (melting point) were measured at a heating rate of 10° C./min from room temperature by a DSC using a pressed sheet (pressed at 380° C.) and powdery polymer as samples, respectively.

[Synthesis Experiment 2]

(Synthesis of Block Copolymer by Production Process No. 2)

5 (Synthesis of PATE Prepolymer)

A titanium-lined reactor was charged with 3.2 kg of hydrated sodium sulfide (water content: 53.7 wt. %) and 6.0 kg of NMP. While gradually heating the contents to 200° C. under a nitrogen gas atmosphere, 2.541 kg of an NMP solution containing 1.326 kg of water and 0.38 mole of hydrogen sulfide were distilled out. Then, 0.123 kg of water was added, followed by the feeding of a mixed solution of 2.35 kg of PDCB and 4.51 kg of NMP. Polymerization was conducted at 220° C. for 10 hours (PDCB/sodium sulfide=0.86 mol/mol, water content/NMP=about 3 mol/kg), thereby obtaining a reaction slurry containing a PATE prepolymer. The number average molecular weight of the prepolymer was 1530 (average polymerization degree: 14).

(Synthesis of PTK Prepolymer)

A titanium-lined 20-l reactor was charged with 3.640 moles of DCBP, 2.039 moles of hydrated sodium sulfide (water content: 53.7 wt. %), 176 g of water and 4.004 kg of NMP. After the reactor being purged with nitrogen gas, the contents were maintained at 220° C. for 1 hour (water content/NMP=about 5 mol/kg) to obtain a reaction slurry containing a PTK prepolymer.

(Synthesis of Block Copolymer)

A charge pot equipped with a heater was mounted on the titanium-lined 20-l reactor which had been charged with the reaction slurry containing the PTK prepolymer (slurry temperature: 220° C.). The pot was charged with 9.12 kg of the reaction slurry containing the PATE prepolymer. After the reaction slurry being heated to 220° C., the reactor was charged with the reaction slurry containing the PATE prepolymer and then with 1.146 kg of water. The contents were thereafter mixed.

The contents were maintained at 260° C. for 2 hours to react them. After the contents being allowed to cool down to 240° C., a final stabilizing treatment of the reaction was effected by adding 0.4356 mole of DCBP and 0.5 kg of NMP and then reacting the contents at 240° C. for 0.2 hour. The reaction conditions upon synthesis of the block copolymer were as follows:

(1) The molar ratio of the total amount of the charged dihalogenated aromatic compounds [the sum of the amount of PDCB charged upon synthesis of the PATE prepolymer and the amount of DCBP charged upon synthesis of the PTK prepolymer] to the total amount of the charged alkali metal sulfide [the sum of the amount of sodium sulfide charged upon synthesis of the PATE prepolymer and the amount of sodium sulfide charged upon synthesis of the PTK prepolymer] was 0.99.

(2) The ratio of PATE blocks to PTK blocks was approximately 60:40 (by weight).

(3) The ratio of the water content to the amount of the charged organic amide (NMP) was about 10 mol/kg.

(Collection of Block Copolymer)

Collection was conducted in a similar manner to Synthesis Experiment 1, thereby obtaining a block copolymer (Block Copolymer $B_2$) The collection rate was 78%.

(Physical Properties of Block Copolymer)

Physical properties of Block Copolymer B2 were as follows:
Melt viscosity: 650 poises.
Transition temperature:
  Tg: 104° C..
  Tm: 301° C. and 324° C..
Melt crystallization temperature:
  Tmc (400° C.): 252° C..
  Tmc (400° C./10 min): 221° C..
Melt crystallization enthalpy:
ΔHmc (400° C.): 43 J/g.
Residual melt crystallization enthalpy: ΔHmc (400° C./10 min): 36 J/g.

Incidentally, the ratio (by weight) of the sum of PATE recurring units to the sum of PTK recurring units was 1.6 (62/38).

[Synthesis Experiment 3]

(Synthesis of Melt-Stable PTK)

A titanium-lined reactor was charged with 90 moles of DCBP, 90 moles of hydrated sodium sulfide (water content: 53.6 wt. %) and 90 kg of NMP (water content/NMP=5 mol/kg). After the reactor being purged with nitrogen gas, the contents were heated from room temperature to 240° C. over 1.5 hours and were then maintained at 240° C. for 2 hours to react them. Thereafter, to effect a stabilization treatment in a final stage of the reaction, 4.5 moles of DCBP, 18 kg of NMP and 90 moles of water were added, followed by a reaction at 240° C. for further 1 hour.

The reactor was cooled and the reaction mixture in the form of a slurry was taken out of the reactor. The slurry was poured into about 200 l of acetone to have the resultant polymer precipitated. The thus-precipitated polymer was collected by filtration and washed twice with acetone and additionally twice with water. Acetone and water were removed to obtain the polymer in a wet form. The wet polymer thus obtained was dried at 100° C. for 12 hours under reduced pressure to obtain Polymer PTK-1 as a fine powder having an average particle size of 11.5 μm.

The melting point of Polymer PTK-1 (powder) was 360° C.

As an index of the molecular weight of PTK, the solution viscosity of PTK-1 was measured.

Namely, the reduced viscosity $\eta_{red}$ of PTK-1 as measured at 25° C. by a Ubbelohde's viscometer after dissolving the PTK-1 at a concentration of 0.5 g/dl in 98% sulfuric acid was 0.63 dl/g.

As an index of the crystallinity of PTK, its density was measured.

Namely, the PTK powder was first of all placed between two sheets of polyimide film ("Kapton"; product of E.I. du Pont de Nemours & Co., Inc.). It was preheated at 385° C. for 2 minutes and then press-formed at 385° C. for 0.5 minute by a hot press. It was then quenched to obtain an amorphous sample whose thickness was about 0.15 mm.

In addition, the amorphous sample thus-obtained was annealed at 280° C. for 30 minutes to prepare an annealed sample with an increased degree of crystallinity. The densities of the amorphous sample and annealed sample (crystallized sample) measured at 25° C. by means of a density gradient tube of the zinc chloride/water system were 1.30 g/cm$^3$ and 1.35 g/cm$^3$, respectively.

With respect to the PTK-1 powder obtained in Synthesis Experiment, the residual melt crystallization enthalpy, ΔHmc (420° C./10 min) was measured as an index of its melt stability. Namely, the temperature corresponding to a peak of melt crystallization measured by the DSC is represented by Tmc (420° C./10 min), while a residual melt crystallization enthalpy, ΔHmc (420° C./10 min) was determined by converting the area of the peak.

Described specifically, about 10 mg of PTK-I (powder) were weighed. After holding the PTK-1 at 50° C.

for 5 minutes in an inert gas atmosphere, it was heated up at a rate of 75° C./min to 420° C. and held at that temperature for 10 minutes. While cooling the PTK-1 at a rate of 10° C./min thereafter, its Tmc (420° C./10 min) and ΔHmc (420° C./10 min) were measured. As a result, ΔHmc (420° C./10 min) and Tmc (420° C./10 min) were 43 J/g and 290° C., respectively.

In addition, ΔHmc (400° C./10 min) and Tmc (400° C./10 min) were 55 J/g and 313.C, respectively.

Example 1 (Spinning of multifilaments)

Under a nitrogen gas stream, Block Copolymer B$_2$ obtained in Synthesis Experiment 2 was charged into an extruder having a cylinder diameter of 35 mm and equipped with a spinneret which had 40 fine holes, each of 0.4 mm across. The block copolymer was melt-extruded at an extrusion temperature of 340° C. and a draw down ratio, R$_1$ (the ratio of the take-up speed of spun filaments to the discharge rate of the resin from the spinneret) of about 200. They were cooled through a nitrogen gas environment and then taken up at a take-up speed of 450 m/min, so that unstretched fibers were obtained.

The unstretched fibers were stretched 3.5 times on a hot plate of 120° C. and then heat-set at 270° C. under a fixed length.

The thus-obtained fibers had the following physical properties. Fiber diameter: 18 μm. Tensile strength (23° C.): 36 kg/mm2 Tensile elongation (23° C.): 35%. Heat shrinkage (200° C./30 min): 16%. Density (25° C.): 1.36 g/cm$^3$.

Incidentally, the density was measured by the density gradient tube method of the lithium bromide/water system.

Example 2 & Comparative Example 1: (Durability Test)

In order to evaluate the durability of each sample at elevated temperatures, the sample was placed in a temperature-controlled oven. Upon an elapse of a predetermined time period, its tensile strength was measured.

Namely, employed as samples were the fibers obtained in Example 1 (Example 2) and fibers produced in a similar manner to Example 1 except that 40 wt. % of PTK-1 synthesized in Synthesis Experiment 3 and 60 wt. % of PATE [poly(p-phenylene thioether); "FORTRON W214"; product of Kureha Chemical Industry Co., Ltd.] to give substantially the same composition as Block Copolymer B$_2$ and the extrusion temperature was changed to 370° C. Portions of each sample were placed for 100, 200, 300, 400 and 500 hours in ovens controlled at 190° C. and 215° C., respectively. They were thereafter taken out of the respective ovens, followed by the measurement of tensile strength at room temperature.

The results are summarized as percent retentions in Table 1.

TABLE 1

| | | Variations of tensile strength (percent retention) when held at 215° C. and 190° C. for long time | | | | | |
|---|---|---|---|---|---|---|---|
| | | Holding time (Hours) | | | | | |
| | | 0 | 100 | 200 | 300 | 400 | 500 |
| | Surrounding temperature (°C.) | Percent retention (%) | | | | | |
| | | Tensile strength | Tensile strength | Tensile strength | Tensile strength | Tensile strength | Tensile strength |
| Ex. 2 | 215 | 100 (36)[1] | 85 | 78 | 72 | 68 | 60 |
| | 190 | 100 (36)[1] | 95 | 91 | 88 | 85 | 82 |
| Comp. Ex. 1 | 215 | 100 (35)[1] | 78 | 63 | 50 | 40 | 30 |
| | 190 | 100 (35)[1] | 65 | 60 | 55 | 53 | 50 |

[1]Parenthesized value indicates the datum obtained when the percent was 100%.

As is envisaged from Table 1, fibers available from a block copolymer useful in the practice of this invention undergo much smaller variations in strength compared with fibers available from a blend of PTK-1 and PATE.

This indicates that the block copolymer having a structure, in which PATE blocks and PTK blocks are chemically coupled together, has a fibrous structure thermally more stable than the mechanical blend of homopolymers of the respective components. Namely, the low melting-point component of the blend polymer is considered to be prone to structural modifications at elevated temperatures, resulting in significant variations in strength.

Example 3 (Spinning of Monofilaments)

Under a nitrogen gas stream, Block Copolymer B$_2$ obtained in Synthesis Experiment 2 was charged into an extruder having a cylinder diameter of 35 mm and equipped with a spinneret which had 12 holes, each of 2.0 mm across. The block copolymer was extruded at an extrusion temperature of 340° C. and then cooled through hot water of 90° C., so that unstretched fibers were obtained.

The unstretched fibers were stretched 4.1 times in hot glycerin of 115° C., 1.1 times in hot air of 180° C. and then subjected to relaxation treatment at 0.98 times in hot air of 270° C..

The thus-obtained fibers had the following physical properties. Fiber diameter: 210 μm. Tensile strength (23° C.): 23 kg/mm$^2$ Tensile elongation (23° C.): 31%. Heat shrinkage (200.C/30 min): 10.5%. Density (25° C.): 1 36 g/cm$^3$.

The fibers were held for 320 hours in an environment of 210° C. and their tensile strength (23° C.) and tensile elongation (23° C.) were measured. They were 16.1 kg/mm$^2$ and 40.0%, respectively.

Example 4

To Block Copolymer B$_1$ obtained in Synthesis Experiment 1, stabilizers were added in the prescribed amounts shown respectively in Table 2. The resultant compositions were separately dry-blended in a tumbler blender, charged into a twin-screw extruder equipped with screws rotatable in the same direction and having a cylinder diameter of 35 mm, molten and kneaded at a quenched and then chopped. Pellet samples of the respective compositions were thus obtained.

Pellet samples were separately fed to an extruder equipped with a spinneret which defines 18 fine holes of 0.5 mm across, melt-extruded at 70 times $R_1$ and an extrusion temperature of 370° C., and quenched at room temperature in air, thereby obtaining corresponding uncylinder stretched filaments. Using a jig, they were stretched 4.5 times at 115° C. and then heat-set at 280° C. for 2 minutes under tension. The physical properties of the resultant yarns and the melt stability of the pellets were as shown in FIG. 2.

The long-run property of the composition added with $Ca(OH)_2$ as a stabilizer and that of the composition added with both $Ca(OH)_2$ and the antioxidant were better compared with that of the block copolymer alone and practically no thermally-decomposed products were observed sticking on the inner wall of the extruder. <Measurement of Physical Properties>

Melt Stability of Pellets

Melt stability was evaluated based on $\eta_{30}^*/\eta_5^*$ and $\eta_{60}^*/\eta_5^*$ obtained in the following manner. About 20 g of each pellet sample were placed in a barrel of a Capirograph, which barrel had been heated at 350° C. The melt viscosity was measured 5 minutes, 30 minutes, 60 minutes later, thereby determining $\eta_5^*$, $\eta_{30}^*$ and $\eta_{60}^*$ (all, at a shear rate of 1200 sec$^{-1}$), respectively. The closer to 1 the ratio, the better the melt stability.

Examples 5–8 & Comparative Examples 2–4

(Blend of Block Copolymer and PATE)

Block Copolymer $B_2$ and PATE [poly(p-phenylene thioether); melt viscosity (350° C., 1200 sec$^{-1}$): 630 poises; product of Kureha Chemical Industry Co., Ltd.] were blended in the proportions shown in Table 3, respectively. Each of the resultant blends was formed into fibers in a similar manner to Example 1 except that the extrusion temperature was changed from 340° C. to 350° C., the take-up speed from 450 m/min to 250 m/min, the stretching temperature from 120° C. to 110° C., the draw ratio from 3.5 times to 3.3 times, and the heat-setting temperature under the fixed length from 270° C. to 250° C. The diameter of the resultant fibers was 25 μm. The physical properties are summarized in Table 3.

TABLE 3

| | Blending weight ratio of polymers (by weight) | | Tensile strength (23° C.) [kg/mm$^2$] | Tensile elongation (23° C.) [%] | Heat Shrinkage factor (200° C./30 min.) [%] | High-temperature durability (percent retention of tensile strength) (230° C./30 min.) [%] |
|---|---|---|---|---|---|---|
| | Block Copolymer $B_2$ | PATE[1] | | | | |
| Ex. 5 | 100 | 0 | 33 | 36 | 11 | 58 |
| Ex. 6 | 90 | 10 | 33 | 35 | 13 | 58 |
| Ex. 7 | 80 | 20 | 32 | 36 | 16 | 53 |
| Ex. 8 | 70 | 30 | 31 | 36 | 18 | 52 |
| Comp. Ex. 2 | 40 | 60 | 31 | 38 | 26 | 36 |
| Comp. Ex. 3 | 20 | 80 | 33 | 41 | 31 | 30 |
| Comp. Ex. 4 | 0 | 100 | 35 | 43 | 39 | 26 |

[1]Poly (p-phenylene thioether) (product of Kureha Chemical Industry Co., Ltd.; Melt viscosity at 350° C. and 1200/sec.: 630 poises).

As is shown in Table 3, no significant differences are observed in the tensile strength and elongation depending on the blending ratio of Block Copolymer $B_2$ to PATE.

However, the heat shrinkage (200° C./30 min) which indicates the dimensional stability at elevated temperatures was found to undergo a considerable variation when the Block Copolymer $B_2$/PATE blending ratio changed from 70/30 to 40/60, because in the composition range where Block Copolymer $B_2$ is contained less than PATE, the influence of PATE having the lower melting point becomes dominant and the heat shrinkage hence increases.

TABLE 2

| | Example 4 | | |
|---|---|---|---|
| | 4-1 | 4-2 | 4-3 |
| Block Copolymer $B_1$ (parts by weight) | 100 | 100 | 100 |
| Basic Compound $Ca(OH)_2$ (parts by weight) | 0 | 0.5 | 0.5 |
| Antioxidant AO-220[1] (parts by weight) | 0 | 0 | 0.2 |
| Density (25° C.) (kg/cm$^3$) | 1.36 | 1.36 | 1.36 |
| Fiber diameter (μm) | 30 | 30 | 30 |
| Tensile strength (23° C.) (kg/mm$^2$) | 24 | 24 | 24 |
| Tensile modulus (23° C.) (kg/mm$^2$) | 410 | 425 | 433 |
| Tensile elongation (23° C.) (%) | 18 | 21 | 22 |
| Durability (Percent retention) (210° C./350 hr) | | | |
| Tensile strength (%) | 73 | 78 | 82 |
| Tensile elongation (%) | 125 | 118 | 111 |
| Melt stability of pellets | | | |
| $\eta_{30}^*/\eta_5^*$ | 1.2 | 0.9 | 0.96 |
| $\eta_{60}^*/\eta_5^*$ | 3.4 | 0.9 | 0.92 |
| Remarks | No Stabilizer | Stabilizer added | Stabilizer added |

[1]"AO-220"; a compound analogous to 1, 3, 5-trimethyl-2, 4, 6-tris-(3, 5-di-t-butyl-4-hydroxybenzyl)benzene; product of Adeka Argus Chemical Co.,Ltd.
[2]Measuring method: JIS-L1013 was followed. Stress (modulus of elasticity) at 10% deformation (elongation).

Turning next to the durability at elevated temperatures (230° C./30 min) as an index of heat resistance, the reduction in durability increased when the proportion of PATE became greater than that of the block copolymer.

It is thus understood from these results that the preferred blending ratio of Block Copolymer B₂ to the other thermoplastic resin, PATE is up to 70/30.

Example 9

(Blend of Block Copolymer and PTK)

Added to 100 parts by weight of Block Copolymer B₂ were 10 parts by weight of PTK-1 obtained in Synthesis Experiment 3 and 0.5 part by weight of Ca(OH)₂ as a stabilizer. The resultant mixture was blended in a tumbler blender, then molten, kneaded and extruded at a cylinder temperature of 370° C. by a twin-screw extruder having a cylinder diameter of 35 mm and equipped with nozzles of 5 mm across and two screws rotatable in the same direction, thereby obtaining pellets.

Under a nitrogen gas stream, those pellets were charged into an extruder having a cylinder diameter of 35 mm and fitted with a spinneret defining 40 fine holes of 0.5 mm across, melt-extruded at an extrusion temperature of 370° C. and a draw down ratio, $R_1$ of about 200, and passed and cooled through a nitrogen gas stream, thereby obtaining unstretched fibers.

The unstretched fibers were stretched 4.0 times on a hot plate of 140° C. and then passed through hot air of 275° C. for 2.5 seconds to conduct heat-setting. The physical properties of the thus-obtained fibers are as follows:

| Fiber diameter: | 22 μm |
|---|---|
| Tensile strength (23° C.) | 33 kg/mm² |
| Tensile elongation (23° C.) | 31% |
| Heat shrinkage (200° C./30 min) | 18% |
| Density | 1.36 g/cm³. |

We claim:

1. Poly(arylene thioether) block copolymer fibers formed by melt-spinning of a thermoplastic material comprising:

(A) 100 parts by weight of a poly(arylene thioether) block copolymer (Component A) alternately comprising (X) at least one poly(arylene thioetherketone) block having predominant recurring units of the formula

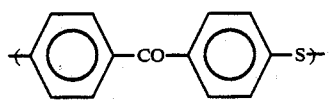

wherein the —CO— and —S— are in the para position to each other and (Y) at least one poly(arylene thioether) block having predominant recurring units of the formula

(a) the ratio of the total amount of the poly(arylene thioether) block (Y) to the total amount of the poly(arylene thioether-ketone) block (X) ranging from 0.05 to 5 by weight, (b) the average polymerization degree of the poly(arylene thioether) block (Y) being at least 10, and (c) said block copolymer having a melt viscosity of 50–100,000 poises as measured at 350° C. and a shear rate of 1,200/sec;

(B) optionally, up to 50 parts by weight of at least one other thermoplastic resin (Component B); and (C) optionally, up to 10 parts by weight of at least one filler (Component C).

2. The fibers as claimed in claim 1, wherein the poly(arylene thioether) block copolymer (Component A) has a melt crystallization temperature, Tmc (400° C./10 min) of at least 170° C. and a residual melt crystallization enthalpy, ΔHmc (400° C./10 min) of at least 10 J/g, wherein Tmc (400° C./10 min) and ΔHmc (400° C./10 min) are determined by a differential scanning calorimeter at a cooling rate of 10° C./min after the block copolymer is held at 50.C for 5 minutes in an inert gas atmosphere, heated to 400° C. at a rate of 75° C./min and then held for 10 minutes at 400° C.

3. The fibers as claimed in claim 1, wherein the poly(arylene thioether) block (Y) in the poly(arylene thioether) block copolymer (Component A) has predominant recurring units of the formula

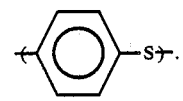

4. The fibers as claimed in claim 1, further comprising, per 100 parts by weight of the poly(arylene thioether) block copolymer (Component A), 0.1–10 parts by weight of at least one basic compound (Component D) selected from the group consisting of hydroxides, oxides and aromatic carboxylates of group IIA metals of the periodic table other than magnesium, and aromatic carboxylates, carbonates, hydroxides, phosphates, including condensation products, and borates, including condensation products, of group IA metals of the periodic table and 0–10 parts by weight of at least one antioxidant (Component E) selected from the group consisting of hindered phenolic compounds, phosphorus compounds and hindered amine compounds.

5. The fibers as claimed in claim 1, wherein the thermoplastic resin (Component B) is at least one polymer selected from poly(arylene thioethers) having predominant recurring units of the formula

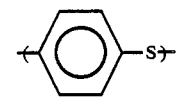

and poly(arylene thioether-ketones) having predominant recurring units of the formula

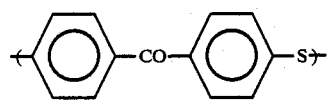

wherein the —CO— and —S— are in the para position to each other.

6. The fibers as claimed in claim 1, wherein the thermoplastic material is free of the thermoplastic resin (Component B).

7. The fibers as claimed in claim 1, wherein the thermoplastic material is free of the filler (Component C).

8. The fibers as claimed in claim 1, wherein the fibers have been stretched at a draw ratio of 1.2-8 times.

* * * * *